(12) United States Patent
Dixon et al.

(10) Patent No.: US 12,196,588 B2
(45) Date of Patent: Jan. 14, 2025

(54) LOW-COST AND SELF CALIBRATING CLAMP-ON ULTRASONIC TRANSDUCER

(71) Applicant: The University of Warwick, Warwickshire (GB)

(72) Inventors: Steven Dixon, Coventry (GB); Zhichao Li, Coventry (GB); Jonathan Harrington, Coventry (GB)

(73) Assignee: THE UNIVERSITY OF WARWICK (GB)

( * ) Notice: Subject to any disclaimer, the term of this patent is extended or adjusted under 35 U.S.C. 154(b) by 228 days.

(21) Appl. No.: 17/275,767

(22) PCT Filed: Sep. 6, 2019

(86) PCT No.: PCT/GB2019/052484
§ 371 (c)(1),
(2) Date: Mar. 12, 2021

(87) PCT Pub. No.: WO2020/053554
PCT Pub. Date: Mar. 19, 2020

(65) Prior Publication Data
US 2021/0325218 A1    Oct. 21, 2021

(30) Foreign Application Priority Data

Sep. 13, 2018    (GB) ..................................... 1814909

(51) Int. Cl.
*G01F 1/00*        (2022.01)
*G01F 1/66*        (2022.01)
(Continued)

(52) U.S. Cl.
CPC .............. *G01F 1/662* (2013.01); *G01F 1/667* (2013.01); *G01F 15/185* (2013.01)

(58) Field of Classification Search
None
See application file for complete search history.

(56) References Cited

U.S. PATENT DOCUMENTS 4,286,470 A * 9/1981 Lynnworth ............. G01F 1/662
73/637
4,425,803 A * 1/1984 Baumoel ................. G01F 1/667
73/861.18
(Continued)

FOREIGN PATENT DOCUMENTS

JP    H1144561 A     2/1999
JP    2003254804 A   9/2003
(Continued)

OTHER PUBLICATIONS

Examination Report issued on Oct. 18, 2022 in corresponding European Patent Application No. 19766329.7.
(Continued)

*Primary Examiner* — Jamel E Williams
(74) *Attorney, Agent, or Firm* — NovoTechIP International PLLC

(57) ABSTRACT

A clamp-on ultrasonic transducer includes an ultrasound-propagating wedge having a first face and a second face which is inclined to the first face. The clamp-on ultrasonic transducer further includes a first piezoelectric element which is mounted on the second face, and which is directed obliquely at the first face. The wedge has a width, w, between first and second side walls, wherein the width, w, is less than or equal to 10 mm.

20 Claims, 7 Drawing Sheets

(51) Int. Cl.
 *G01F 1/667* (2022.01)
 *G01F 15/18* (2006.01)

(56) References Cited

U.S. PATENT DOCUMENTS

| | | | | |
|---|---|---|---|---|
| 4,454,767 | A * | 6/1984 | Shinkai | G01F 1/662 73/861.28 |
| 5,533,408 | A * | 7/1996 | Oldenziel | G01F 1/7082 73/861.27 |
| 7,159,472 | B1 * | 1/2007 | Hastings | G01F 1/667 73/861.27 |
| 10,641,628 | B2 * | 5/2020 | Niimura | G01F 15/18 |
| 2003/0041674 | A1 * | 3/2003 | Ohnishi | G01F 1/66 73/861.27 |
| 2007/0137312 | A1 | 6/2007 | Panicke et al. | |
| 2012/0318069 | A1 | 12/2012 | Murakami | |
| 2013/0080081 | A1 | 3/2013 | Dugger et al. | |
| 2013/0180341 | A1 | 7/2013 | Murakami | |
| 2014/0123767 | A1 * | 5/2014 | Ao | G01N 29/28 73/861.28 |
| 2015/0107371 | A1 * | 4/2015 | Khrakovsky | G01F 1/662 73/861.28 |

FOREIGN PATENT DOCUMENTS

| | | |
|---|---|---|
| JP | 2003302267 A | 10/2003 |
| JP | 2005241436 A | 9/2005 |
| KR | 20110077710 A | 7/2011 |
| RU | 80957 U1 | 9/2008 |

OTHER PUBLICATIONS

Wikipedia: "Polyether ether ketone", Wikipedia, Sep. 6, 2018 (Sep. 6, 2018), XP055637478, Retrieved from the Internet: URL: https://en.wikipedia.org/w/index.php?title=Polyether_ether_ketone&oldid=858320863 [retrieved on Oct. 30, 2019].

Great Britain Intellectual Property Office Combined Search and Examination Report dated Mar. 13, 2019 from Great Britain Application No. GB1814909.6.

International Search Report and Written Opinion dated Jan. 10, 2020 from International Patent Application No. PCT/GB2019/052484.

Wikipedia; "Polyether ether ketone"; Sep. 6, 2018; pp. 1-4.

\* cited by examiner

LOW-COST AND SELF CALIBRATING CLAMP-ON ULTRASONIC TRANSDUCER

FIELD

The present invention relates to a clamp-on ultrasonic transducer.

The present invention also relates to a clamp-on ultrasonic transducer assembly comprising a pipe clamp and at least one clamp-on ultrasonic transducer for clamping onto a pipe and for measuring flow rate of a fluid through the pipe.

The present invention also relates to a method of using a clamp-on ultrasonic transducer for measuring flow rate of a fluid through the pipe.

BACKGROUND

Ultrasonic, clamp-on, transit-time flow metering is extensively used for measuring flow of liquids and, to a lesser extent, gases in pipes. This type of metering involves clamping two or more transducers (or "sensors") to the outside of a pipe in which a liquid is flowing. One transducer generates an ultrasonic wave that enters the pipe wall, and travels through the liquid. The wave can then couple through the pipe wall and be detected by the second transducer or bounce within the liquid column several times before being detected by the second transducer, which can be clamped on the same side or on the opposite side of the pipe as the first sensor. The process is reversed so that the second transducer generates an ultrasonic wave that travels along the same path (but in the opposite direction) and is detected by the first transducer. The difference in the transit time for these two wave packets is related to the liquid flow rate through the pipe. The wave that travels generally in a downstream direction (i.e., with the flow) takes a shorter time to cover the same distance, than the other wave which generally travels in an upstream direction.

A significant component cost is the cost of the transducers. Typically, the transducers are made from polyetheretherketone (PEEK) and may be enclosed in a stainless-steel housing for protection. Although PEEK has superior mechanical properties for ultrasonic wedges in that it has favourable elasticity and low attenuation, it is expensive in both material and manufacturing costs compared to most other plastics since the starting material is expensive and requires extensive machining starting from a solid bar or block.

Although injection moulding of PEEK is possible, if components are made using PEEK, then they tend to be made using PEEK containing a filler, such as glass fibre. Introducing other materials into PEEK, especially if they introduce inhomogeneities, tends to increase ultrasonic attenuation. Moreover, injection moulding of PEEK tends to require specialist machines, operating at higher pressures and temperatures than is normally required for injection moulding materials, such as ABS. The moulds for injection moulding PEEK also need specific design considerations.

SUMMARY

According to a first aspect of the present invention there is provided a clamp-on ultrasonic transducer. The clamp-on ultrasonic transducer comprises an ultrasound-propagating wedge having a first face and a second face which is inclined to the first face. The clamp-on ultrasonic transducer further comprises a first piezoelectric element which is mounted on the second face and which is directed obliquely at the first face. The wedge has a width, w, between first and second side walls, wherein the width, w, is less than or equal to 10 mm. This can help to reduce the cost of manufacture, for example, by allowing the wedge to be made by injection moulding when it might otherwise not be possible to form from injection moulding and/or allow the transducer to be used with pipes of a range of diameters.

The wedge may be injection moulded. The wedge may consist of or essentially consist of polyetheretherketone (PEEK). If the wedge consists of or essentially consists of PEEK, then the wedge is preferably injection moulded and, more preferably, does not contain any filler, such as glass fibre.

The width, w, is preferably between 5 and 9 mm.

The first face may be flat. Alternatively, the first face may be concave for better fitting to a pipe.

The clamp-on ultrasonic transducer may comprise a third face which is parallel to the first face, and a second piezoelectric element mounted on the first face and which is directed perpendicularly at the third face. Thus, the second piezoelectric element can be used to send waves perpendicularly through the pipe wall to obtain a value for ultrasound velocity in a fluid in the pipe.

According to a second aspect of the present invention there is provided a clamp-on ultrasonic transducer. The clamp-on ultrasonic transducer comprises an ultrasound-propagating wedge having a first face and a second face which is inclined to the first face. The clamp-on ultrasonic transducer further comprises a first piezoelectric element which is mounted on the second face and which is directed obliquely at the first face. The wedge consists of or essentially consists of PEEK and is injection moulded. This can help to reduce the cost of manufacture. The wedge preferably does not contain any filler, such as glass fibre.

According to a third aspect of the present invention there is provided a clamp-on ultrasonic transducer comprising an ultrasound-propagating wedge having a first face, a second face which is inclined to the first face, and a third face which is parallel to the first face. The clamp-on ultrasonic transducer comprises a first piezoelectric element which is mounted on the second face and which is directed obliquely at the first face, and a second piezoelectric element which is mounted on the first face and which is directed perpendicularly at the third face.

Thus, the second piezoelectric element can be used to send waves perpendicularly through the pipe wall to obtain a value for ultrasound velocity in a fluid in the pipe.

According to a fourth aspect of the present invention there is provided a pipe clamp for a clamp-on ultrasonic transducer, the pipe clamp comprising first and second parts closeable around a pipe, at least one hinge on a first side of the pipe clamp, at least one closure (for example, a clasp) on a second side (preferably opposite side) of the pipe clamp and at least one slot in the first or second part for receiving at least one sensor such that when the first and second parts are closed around the pipe, the sensor is presented to the pipe.

The first and second parts are preferably formed of plastic.

The pipe clamp may comprise first and second hinges spaced apart along the first side of the pipe clamp. The pipe clamp may comprise first and second closures spaced apart along on the second side of the pipe clamp.

The first part may include at least one integrally-formed first hinge part, and the second part includes at least one integrally-formed second hinge part arranged to cooperate with the at least one first hinge part so as to form the at least one hinge. The first part may include at least one integrally-formed first closure part, and the second part includes at least one integrally-formed second closure part arranged to cooperate with the at least one first closure part so as to form the at least one closure.

The pipe clamp is preferably a two-piece pipe clamp consisting of or essentially consisting of the first and second parts.

According to a fifth aspect of the present invention there is provided a clamp-on ultrasonic transducer assembly comprising the pipe clamp and at least one sensor comprising the clamp-on ultrasonic transducer received in the at least one slot.

The clamp-on ultrasonic transducer assembly may comprise two or more sensors, for example, three or four sensors. Each sensor may be received in a respective slot. Two or more sensors may be received in one slot.

According to a sixth aspect of the present invention is provided a method of using the ultrasonic transducer installed on a pipe through which a fluid flows, the method comprising using a first piezoelectric element for a flow measurement and using the second piezoelectric for obtaining a value for ultrasound velocity in a fluid in the pipe. Thus, a more accurate measurement of flow rate can be obtained.

The method may comprise using the value of ultrasound velocity to obtain a value of flow rate through the pipe.

According to a seventh aspect of the present invention is provided a computer program comprising instructions for performing the method.

According to a seventh aspect of the present invention is provided a computer program product comprising a computer readable medium (which may be non-transitory) storing the computer program.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
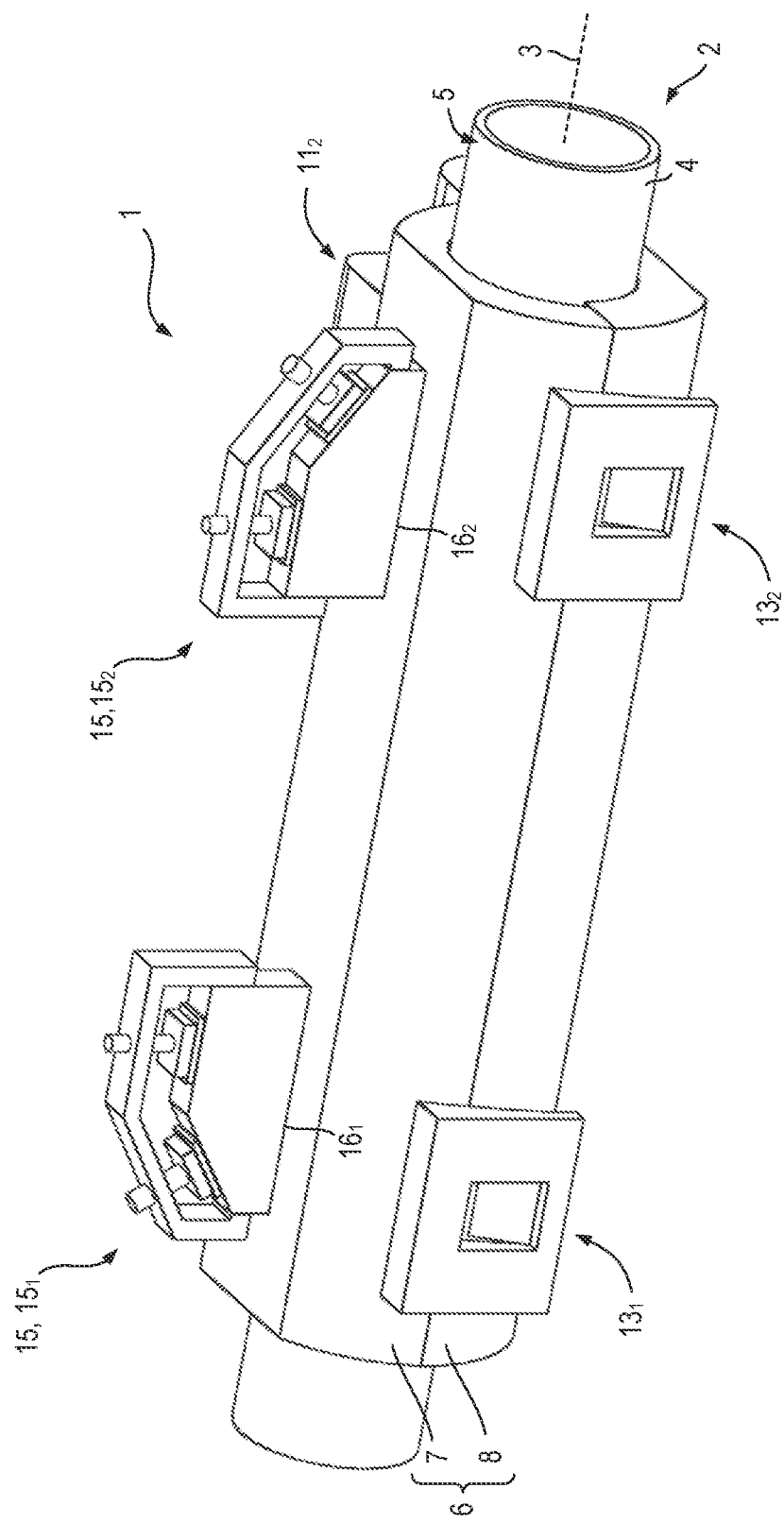
FIG. 1 is a perspective view of a clamp-on ultrasonic transducer assembly clamped onto a pipe, and which includes a two-part clamp and two wedge-type ultrasonic transducers.

Referring to FIG. 1, a clamp-on ultrasonic transducer assembly 1 is shown clamped around a pipe 2. The pipe 2 extends along a longitudinal axis 3 and comprises a pipe wall 4 having an outer surface 5. The clamp-on ultrasonic transducer assembly 1 (herein also referred to as a "clamp-on assembly", "clamp-on flow meter" or simply "flow meter") comprises a generally cylindrical, two-piece plastic pipe clamp 6 having first and second parts 7, 8 (or "halves").

Figure 2:
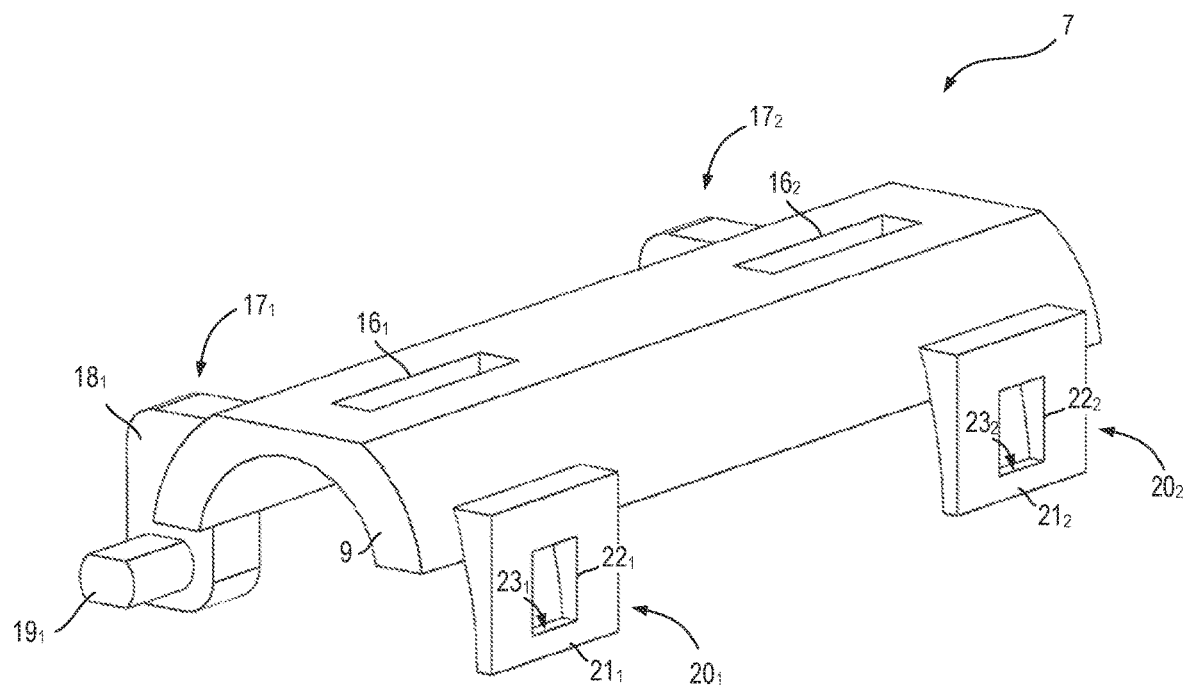
FIG. 2 is a perspective view of a first part of the clamp shown in FIG. 1.
Figure 3:
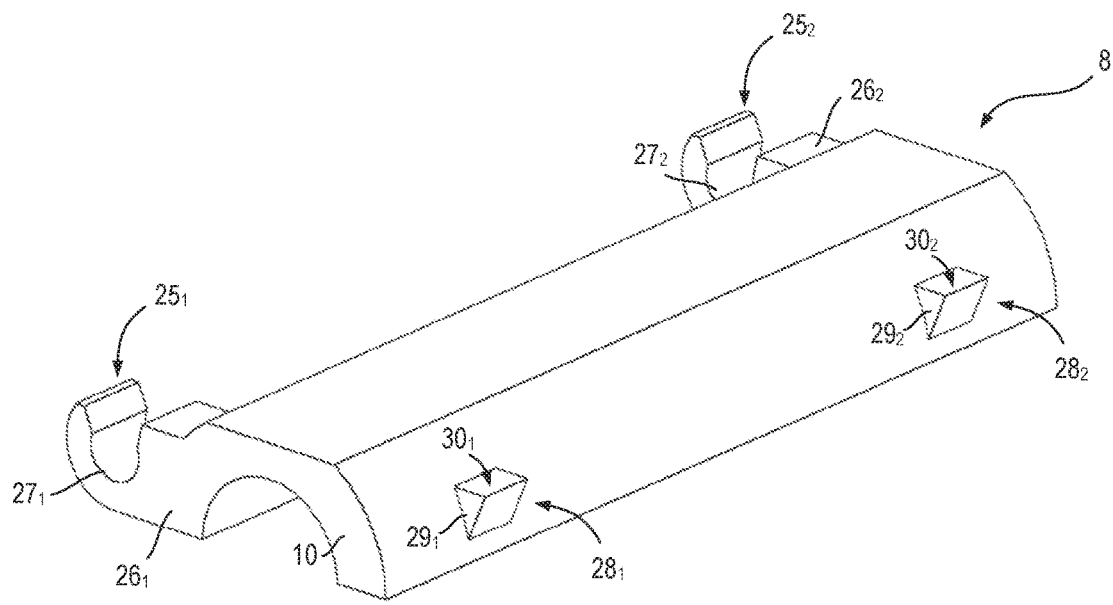
FIG. 3 is a perspective view of a second part of the clamp shown in FIG. 1.

Referring also to FIGS. 2 and 3, the first and second pipe clamp parts 7, 8 comprise generally half-cylinder-shaped shells 9, 10 held together by a pair of hinges $11_1$, $11_2$ (mostly obscured in FIG. 1) spaced apart along one side of the pipe clamp 6 and by a pair of closures $13_1$, $13_2$ (herein referred to as "clips" or "clasps") spaced apart along the opposite side of the pipe clamp 6.

The pipe clamp 6 holds first and second sensors 15, $15_1$, $15_2$ in fixed positions in first and second slots $16_1$, $16_2$ respectively which are spaced apart along the pipe 2. The slots $16_1$, $16_2$ have dimensions which match those of the sensors $15_1$, $15_2$ such that the sensors $15_1$, $15_2$ fit securely in the slots $16_1$, $16_2$. Thus, the slots $16_1$, $16_2$ can be used to locate the sensors $15_1$, $15_2$ precisely with respect to each other. The pipe clamp 6 presses the sensors $15_1$, $15_2$ against the outer surface 5 of the pipe wall 4. A single slot (not shown) or slots $16_1$, $16_2$ which are longer than the sensors $15_1$, $15_2$ which can allow the separation of the sensors $15_1$, $15_2$ to be varied.

The same sensors 15, $15_1$, $15_2$ can be used with other, pipe clamps (not shown) having generally the same configuration as the pipe clamp 6, but arranged to fit pipes of other, different sizes (i.e. pipes having greater or smaller outer diameter). Thus, identical sensors 15 can be produced, while different sizes of the pipe clamps (not shown) can be formed, thereby allowing clamp-on flow meters (not shown) for different sizes of pipes to manufactured easily and/or cheaply.

Referring in particular to FIG. 2, the first pipe clamp part 7 comprises an elongate, generally half-cylinder-shaped shell 9 (or "body") in which the first and second slots $16_1$, $16_2$ are provided as rectangular through-holes. The first pipe clamp part 7 includes first and second first hinge parts $17_1$, $17_2$ (each first hinge part $17_1$, $17_2$ forming one half of a hinge $11_1$, $11_2$) integrally formed with the shell 9. Each first hinge part $17_1$, $17_2$ comprises an outwardly- and downwardly-extending arm $18_1$, $18_2$ supporting a stub or pin $19_1$, $19_2$. The first pipe clamp part 7 also includes first and second first closure parts $20_1$, $20_2$ (each first closure part $20_1$, $20_2$ forming one half of a respective closure $13_1$, $13_2$) integrally formed with the body 9. The first closure parts $20_1$, $20_2$ comprise a flap $21_1$, $21_2$ having an aperture $22_1$, $22_2$ having an inner wall $23_1$, $23_2$ providing a retaining surface.

Referring in particular to FIG. 3, the second pipe clamp part 8 comprises an elongate, generally half-cylinder-shaped shell 10 (or "body"). The second pipe clamp part 8 includes first and second second hinge parts $25_1$, $25_2$ (each second hinge part $25_1$, $25_2$ forming one half of a hinge $11_1$, $11_2$) integrally formed with the shell 10. Each second hinge part $25_1$, $25_2$ comprises an outwardly-extending arm $26_1$, $26_2$ supporting a respective half collar $27_1$, $27_2$ for receiving a respective pin $19_1$, $19_2$ form the first pipe clamp part 7. The second pipe clamp part 8 includes first and second second closure parts $28_1$, $28_2$ (each second closure part $28_1$, $28_2$ forming one half of a clasp $13_1$, $13_2$) integrally formed with the body 10. The second closure parts $28_1$, $28_2$ takes the form of a barbed head comprising an inclined leading edge $29_1$, $29_2$ (or "ramp-like tooth") and a perpendicular trailing edge $30_1$, $30_2$ for engaging with the retaining wall $23_1$, $23_2$.

Figure 4:
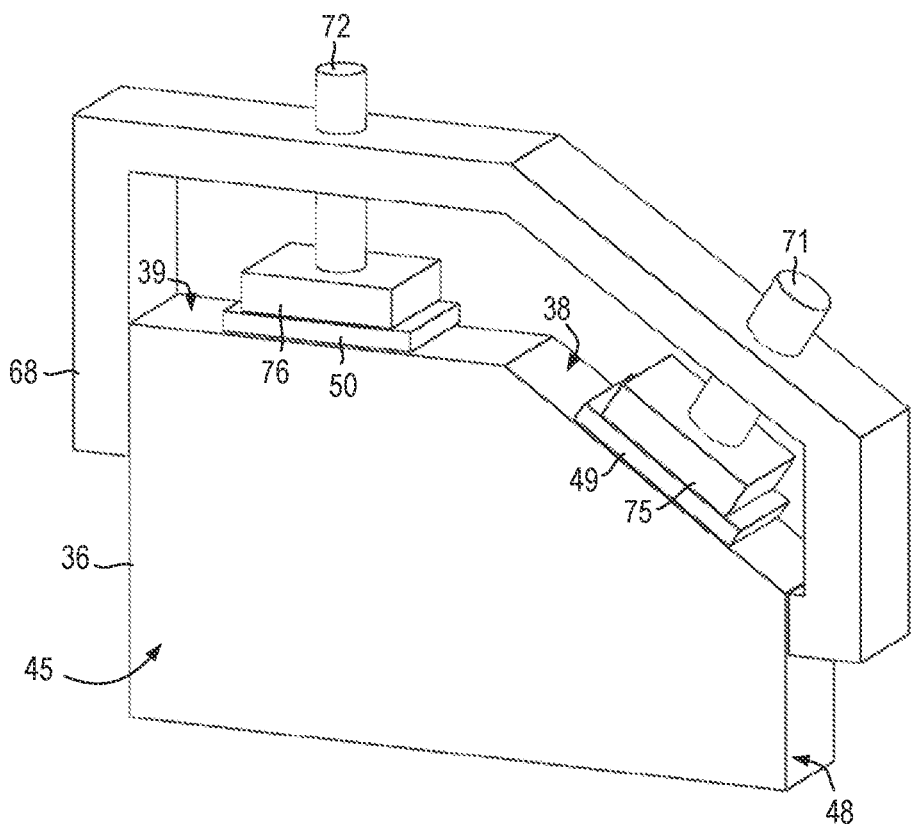
FIG. 4 is a perspective view of a wedge-type ultrasonic transducer shown in FIG. 1.
Figure 5:
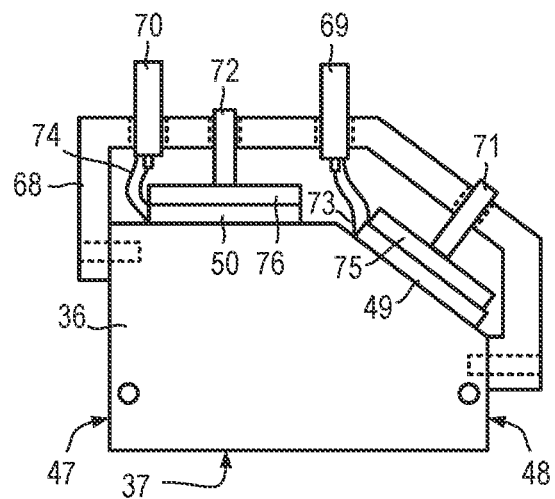
FIG. 5 is a side view of the wedge-type ultrasonic transducer.
Figure 6:
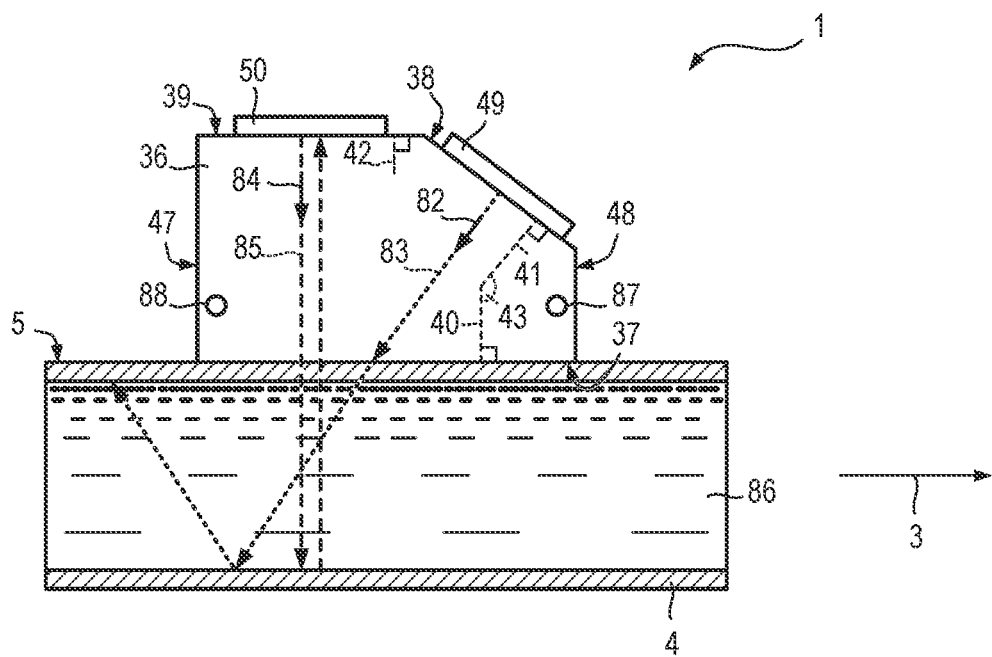
FIG. 6 is a longitudinal cross-sectional view of the pipe and a wedge-type ultrasonic transducer.
Figure 7:
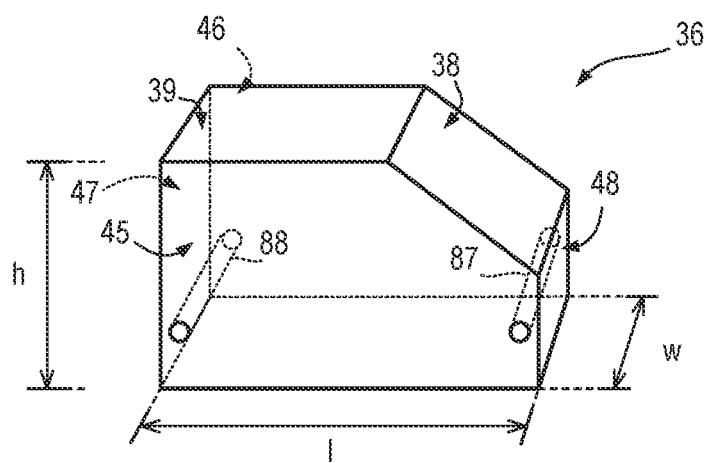
FIG. 7 is a perspective view of a wedge of PEEK.

Referring to FIGS. 4 to 6, the sensors 15 take the form of ultrasonic transducers comprises an ultrasound-propagating element 36 (or "wedge") made from polyetheretherketone (PEEK). The wedge 36 is sufficiently narrow that it allows the wedge 36 to be formed by injection moulding, in particular at lower pressures and temperatures than normal. The wedge 36 does not include a filler, such as glass fibre, to reinforce and/or to facilitate manufacture. The wedge 36 is also sufficiently narrow that is can be used on a variety of pipe diameter, for example, from 5 mm to 150 mm or more.

The wedge 36 generally takes the form of a rectangular prism having a chamfer. The wedge 36 comprises a first face 37 (herein referred to as a "bottom face"), and second and third faces 38, 39 (herein referred to as a "first top face" and "second top face" respectively) opposite the first face 37. The bottom face 37 is preferably flat and is in direct contact with the outer surface 5 of the pipe wall 4.

The first top face 38 is inclined to the bottom face 37. The second top face 39 lies parallel to the bottom face 37. The normal 40 of the bottom face 37 and the normal 41 of the first top face 38 subtend an angle 43.

The wedge 36 also includes fourth and fifth opposite faces 45, 46 (herein referred to as "first side" and "second side" respectively). The bottom face 37 of the wedge 36 has a width, w, which is equal to or less than 10 mm, preferably between 5 and 9 mm and more preferably 6 mm. The bottom face 37 is preferably the narrowest part of the wedge 36. The wedge 36 also includes sixth and seventh opposite faces 47, 48 (herein referred to as "first end" and "second end" respectively). The bottom face 37 of the wedge 36 has a length, l, between the first and second ends 47, 48. The length, l, is greater than the width, w, and is less than 80 mm. The wedge 36 has a height, h, between the bottom face 37 and the second top face 39, which is between about 10 and 50 mm.

The sensor 15 includes a first piezoelectric element 49 which is mounted on the first top face 38 and which is directed obliquely at the bottom face 37. The sensor 15 also includes a second piezoelectric element 50 which is mounted on the second top face 39 and is directed perpendicularly to the bottom face 37.

Figure 8:
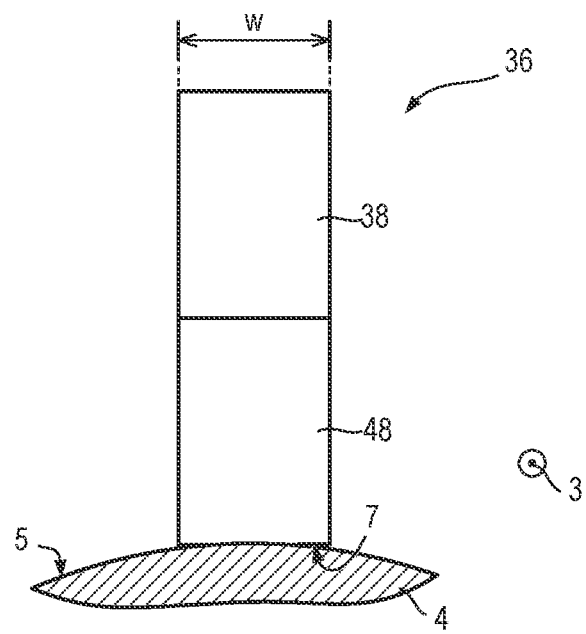
FIG. 8 is a partial end elevation of a pipe and wedge.

Referring also to FIG. 8, when the sensor 15 is in contact with a pipe wall 4, the area of contact is a narrow rectangular region having width less than the width, w. This is because the bottom face 37 is flat and the pipe wall 4 is curved. The wedge 36 is narrower compared to conventional wedges. By making the wedge 36 narrower, not only are material costs reduced, but also the volume of the wedge 36 is reduced to a size where it can be more easily injection moulded.

The bottom face 37 of the wedge 36 may be moulded so that it is cylindrically concave (i.e., transversely concave and longitudinally straight) thereby helping to increase the area of contact. Alternatively, the bottom face 37 of the wedge 36 may be machined after moulding so that it is cylindrically concave. Even if such a wedge 36 is machined after moulding, there can still be a significant cost saving in the quantity of material used and the amount of machining required, and potentially increase manufacturing rate.

As hereinbefore described, the sensor 15 can be used on any diameter of pipe 2 and can take the form of an insert in a pipe clamp 6 (FIG. 1). The pipe clamp 6 (FIG. 1) can be configured for use with any size of pipe 2. Thus, a faulty or damaged sensor 15 can be easily replaced by slotting a replacement sensor 15 into an appropriate slot 16₁, 16₂ (FIG. 1).

Referring in particular to FIGS. 4 to 7, the piezoelectric elements 49, 50 adapted for a given frequency of operation can be can easily be replaced with ones operating at a different frequency. The sensor 15 may also be used in a sealed unit (not shown). The ultrasonic sensor 15 has two piezoelectric elements 49, 50. However, only one in a pair of sensors 15 may use both piezoelectric elements 49, 50, although each sensor 15 in the pair may include two piezoelectric elements 49, 50 (with one element 49, 50 in one sensor 15 being redundant) for efficient manufacturing.

Referring to FIGS. 4 and 5, a bracket 68 used for holding electrical connectors 69, 70 (not shown in FIG. 4) and loading screws 71, 72 can also be adapted to hold the piezoelectric elements 49, 50 in position. The piezoelectric elements 49, 50 can have a wrap-around electrode (not shown) or be provided with electrodes (not shown) on both sides, if a shallow channel (not shown) is machined into the wedge 36 to accept a soldered wire 73, 74 (not shown in FIG. 4).

In the illustrated embodiment, the piezoelectric elements 49, 50 are shown held in by a clamping arrangement using loading plates 75, 76. However, the piezoelectric elements 49, 50 can be glued into position using a layer of adhesive (not shown) between a piezoelectric element 49, 50 and the wedge 36. The piezoelectric elements 49, 50 can be coupled to the wedge 36 via a thin layer of grease (not shown) or elastomeric material (no shown). Preferably, a jig (not shown) is used to glue the elements 49, 50 to help ensure accurate and reproducible placement.

Referring in particular to FIG. 6, when excited, the first piezoelectric element 49 emits an ultrasonic wave 82 along a path 83. When excited, the second piezoelectric element 50 can send an ultrasonic wave 84 along a path 85 into the pipe 2 and through the liquid 86 so that, knowing the pipe material and dimensions, the ultrasonic velocity in the liquid 86 can be measured and used in the calculation of the flow velocity, or used to calculate the temperature of the liquid 86.

Other measurements methods can be used. For example, if the internal diameter of the pipe 2 is known, then a signal processor 89 (for example, in the form of a microcontroller or a computer) can determine the speed of sound in the liquid 86 without further information (e.g. without information about material properties). Alternatively, if the outside diameter of the pipe 2 is known and information about the pipe material are known, then the signal processor can determine the speed of sound in the liquid 86.

Figure 9:
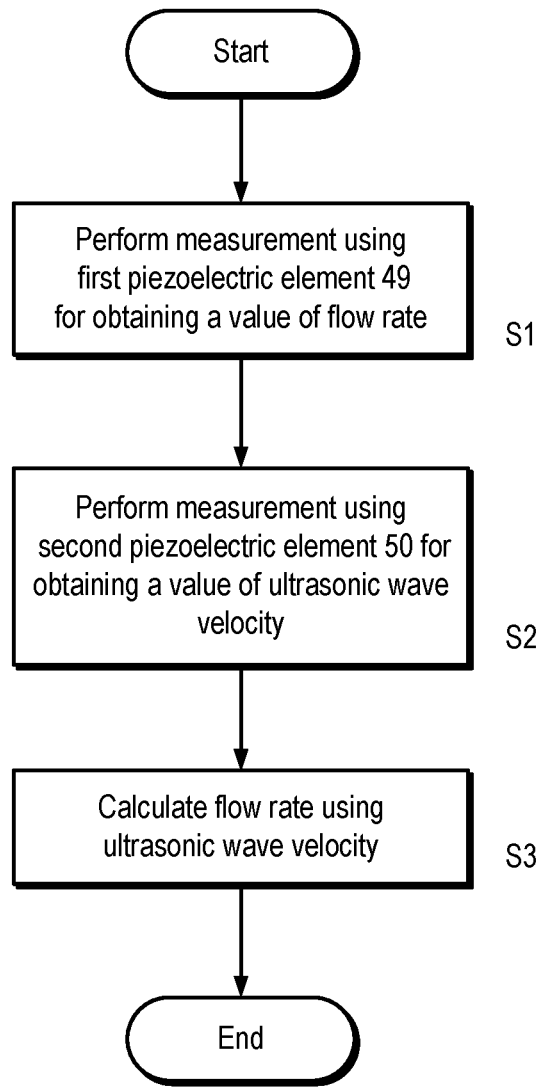
FIG. 9 is a process flow diagram of a method of using the wedge-type ultrasonic transducer.

Referring also to FIG. 9, a measurement system (not shown) can perform a measurement of flow rate of the fluid 86 through the pipe 2.

Figure 10:
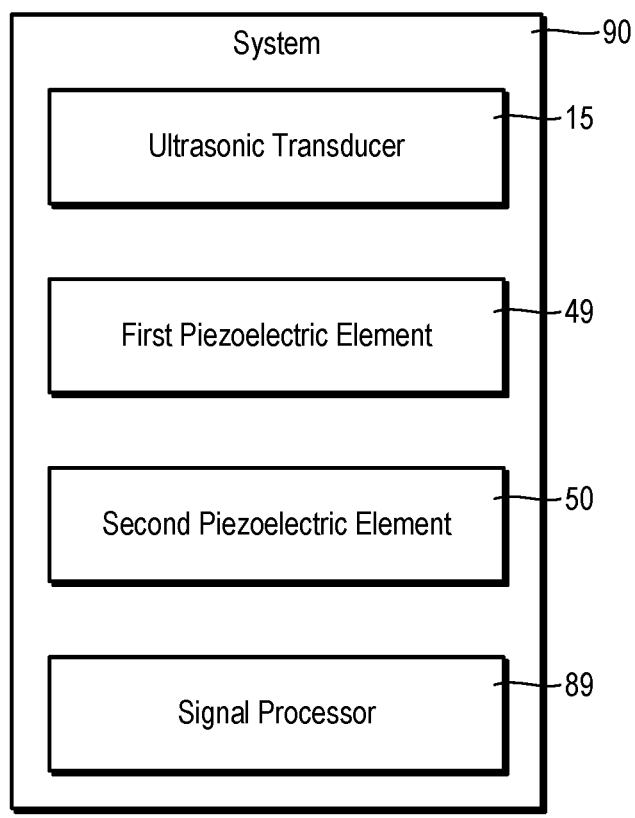
FIG. 10 is a system block diagram of a system for measuring a value of ultrasonic wave velocity to calculate a flow rate.

Referring to FIG. 10, the measurement system 90 uses a first piezoelectric element 49 of, for example, the first sensor 15₁ (together with a first piezoelectric element 49 of the second sensor 15₂) to perform a flow measurement (step S1). The measurement system (not shown) uses the second piezoelectric element 50 of the first or second sensor 15₁, 15₂ to obtain a value for ultrasound velocity in a fluid in the pipe (step S2). The measurement system (not shown) uses the measured value of ultrasonic wave velocity to calculate the flow rate (step S3). As described above, a signal processor 89 (for example, in the form of a microcontroller or a computer) can determine the speed of sound in the liquid 86 without further information.

First and second transverse through-holes 87, 88 pass between the first and second sides 15, 16, proximate to the first and second ends 47, 48. The through-holes 87, 88 can be used to receive a rod or bar (not shown) for locating the wedge 36 in the clamp 6 (FIG. 1) and for providing a point from which a spring (not shown) can urge the wedge 36 against the pipe 2.

The first end 47 of the wedge 36 may patterned (not shown) or have features (not shown) to provide a scattering surface to discourage reverberation within the wedge 36 and simplify the temporal profile of the received ultrasonic signal. For some types of measurements, scattering features can be omitted as waves reverberating within the wedge 6 may not be an issue. As mentioned hereinbefore, the size and shape of the wedge 6 can simplify manufacturing processes and reduce manufacturing costs, and more readily lends itself to injection moulding and mass production.

Modifications

It will be appreciated that various modifications may be made to the embodiments hereinbefore described. Such modifications may involve equivalent and other features which are already known in the design, manufacture and use of clamp-on ultrasonic transducers and component parts thereof and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A clamp-on ultrasonic transducer comprising:
an ultrasound-propagating wedge having:
  a first face; and
  a second face which is inclined relative to the first face; and
a first piezoelectric element which is mounted on the second face and which is directed obliquely at the first face;
wherein:
the wedge has a width, w, between first and second side walls, wherein the width, w, is less than or equal to 10 mm,
the first face is flat,
the first face is a bottom face of the wedge,
the second face and a third face, adjacent to the second face, form a top face of the wedge, and
the third face is parallel to the first face.

2. The clamp-on ultrasonic transducer of claim 1, wherein the wedge is injection moulded.

3. The clamp-on ultrasonic transducer of claim 1, wherein the wedge consists of polyetheretherketone.

4. The clamp-on ultrasonic transducer of claim 1, further comprising:
a third face which is parallel to the first face; and
a second piezoelectric element which is mounted on the third face and which is configured and located so that movement of the second piezoelectric element is directed perpendicularly at the first face to send ultrasonic waves toward the first face.

5. A system comprising:
a clamp-on ultrasonic transducer comprising:
an ultrasound-propagating wedge having:
  a first face;
  a second face which is inclined to the first face; and
  a third face which is parallel to the first face;
a first piezoelectric element which is mounted on the second face and which is directed obliquely at the first face; and
a second piezoelectric element which is mounted on the third face and which is configured and located so that movement of the second piezoelectric element is directed perpendicularly at the first face to send ultrasonic waves toward the first face; and
a signal processor configured to perform an ultrasonic wave velocity measurement of a fluid flowing in a pipe having a pipe wall by causing the second piezoelectric element to emit an ultrasonic wave perpendicularly through the pipe wall into the pipe and, in response to receiving a signal from the second piezoelectric element reflected from the pipe wall, to obtain a value for ultrasound velocity in the fluid in the pipe and to calculate flow rate of the fluid in the pipe using the value of ultrasound velocity.

6. A pipe clamp for a clamp-on ultrasonic transducer, the pipe clamp comprising:
first and second parts closeable around a pipe;
at least one hinge on a first side of the pipe clamp;
at least one closure on a second side of the pipe clamp; and
at least one slot in the first or second part for receiving at least one sensor such that when the first and second parts are closed around the pipe, the sensor is in contact with the pipe;
wherein:
the at least one closure comprises at least one clasp;
the first part includes at least one integrally-formed first closure part;
the second part includes at least one integrally-formed second closure part, wherein the at least one integrally-formed first closure part is arranged to cooperate with the at least one integrally-formed second closure part so as to form the at least one closure; and
the at least one integrally-formed first closure part forms a first half of the clasp and the least one integrally-formed second closure part forms a second half of the clasp.

7. The pipe clamp of claim 6, wherein the first and second parts are formed of plastic.

8. The pipe clamp of claim 6, wherein the at least one hinge on the first side of the pipe clamp comprises:
first and second hinges spaced apart along the first side of the pipe clamp.

9. The pipe clamp of claim 6, wherein the at least one closure on the second side of the pipe clamp comprises:
first and second closures spaced apart along on the second side of the pipe clamp.

10. The pipe clamp of claim 6, wherein the first part includes at least one integrally-formed first hinge part, and the second part includes at least one integrally-formed second hinge part arranged to cooperate with the at least one first hinge part so as to form the at least one hinge.

11. A clamp-on ultrasonic transducer assembly comprising:
the pipe clamp of claim 6; and
at least one sensor comprising at least one clamp-on ultrasonic transducer received in the at least one slot, the at least one clamp-on ultrasonic transducer comprising:

an ultrasound-propagating wedge having:
  a first face; and
  a second face which is inclined to the first face; and
a first piezoelectric element which is mounted on the second face and which is directed obliquely at the first face;
wherein the wedge has a width, w, between first and second side walls, wherein the width, w, is less than or equal to 10 mm.

12. A method of using the ultrasonic transducer of claim 4 installed on a pipe through which a fluid flows, the method comprising:
  using the first piezoelectric element for a flow measurement; and
  using the second piezoelectric for obtaining a value for ultrasound velocity in the fluid in the pipe.

13. The method of claim 12, further comprising:
  using the value of ultrasound velocity to obtain a value of flow rate through the pipe.

14. A computer program product comprising a non-transitory computer readable medium storing the computer program comprising instructions for:
  performing a first fluid flow measurement for a fluid moving through a pipe, comprising:
    causing a first piezoelectric element to emit a first ultrasonic wave into the pipe through a pipe wall; and
  performing an ultrasonic wave velocity measurement to determine a value for ultrasound velocity comprising:
    causing a second piezoelectric element to emit a second ultrasonic wave perpendicularly into the pipe through the pipe wall,
    in response to receiving a signal from the second piezoelectric element reflected from the pipe wall, obtaining the value for ultrasound velocity in the fluid in the pipe, and
    using a measured value of ultrasonic wave velocity to calculate a second flow rate.

15. The clamp-on ultrasonic transducer of claim 1, further comprising:
  first and second transverse through-holes passing between first and second sides proximate to first and second ends of the ultrasound-propagating wedge for receiving a rod or bar configured for locating the ultrasound-propagating wedge in a clamp and/or for providing point(s) from which a spring can urge the ultrasound-propagating wedge against a pipe.

16. The pipe clamp of claim 6, wherein the first closure part includes at least one wall providing a retaining surface and the second closure part includes at least one barbed head comprising an inclined leading and a trailing edge configured for engaging with the retaining wall.

17. The pipe clamp of claim 6, wherein the integrally-formed first closure part includes a pin and the integrally-formed second closure part includes a collar for receiving the pin.

18. The clamp-on ultrasonic transducer of claim 1, wherein the wedge has a height of between 10 and 50 mm.

19. The clamp-on ultrasonic transducer of claim 1, wherein the wedge has a length which is greater than 9 mm and less than 80 mm.

20. The clamp-on ultrasonic transducer of claim 1, wherein the width, w, is between 5 and 9 mm.

* * * * *